United States Patent
Kumagai

(10) Patent No.: US 6,644,822 B2
(45) Date of Patent: Nov. 11, 2003

(54) LIGHT DIFFUSION UNIT

(75) Inventor: Keiichiro Kumagai, Tokyo (JP)

(73) Assignee: NEC Corporation, Tokyo (JP)

( * ) Notice: Subject to any disclaimer, the term of this patent is extended or adjusted under 35 U.S.C. 154(b) by 106 days.

(21) Appl. No.: 09/955,185

(22) Filed: Sep. 19, 2001

(65) Prior Publication Data

US 2002/0034070 A1 Mar. 21, 2002

(30) Foreign Application Priority Data

Sep. 19, 2000 (JP) .................................... 2000-283990

(51) Int. Cl.$^7$ ................................................ H01H 9/00
(52) U.S. Cl. ............................ 362/26; 362/31; 200/314
(58) Field of Search ............................. 362/31, 26, 331, 362/332, 330, 355, 356, 360; 200/314, 315

(56) References Cited

U.S. PATENT DOCUMENTS

| 4,670,633 A | * | 6/1987 | Kaiwa et al. ................. 362/24 |
| 4,937,408 A | * | 6/1990 | Hattori et al. ............... 200/314 |
| 5,053,928 A | * | 10/1991 | Pasco .......................... 362/27 |
| 5,399,820 A | | 3/1995 | Silfvast |
| 5,573,107 A | | 11/1996 | Nakano et al. |

FOREIGN PATENT DOCUMENTS

| FR | 2 438 294 | 4/1980 |
| GB | 0 148 437 A1 | 7/1985 |

* cited by examiner

Primary Examiner—Thomas M. Sember
(74) Attorney, Agent, or Firm—Young & Thompson

(57) ABSTRACT

A light diffusion unit includes (a) a substrate formed with a first hole, (b) a case formed with a second hole and covering the substrate therewith, (c) a light source mounted on the substrate, (d) a light diffuser arranged in the second hole of the case for externally radiating a light emitted from the light source, and (e) a light guide arranged between the substrate and the light diffuser for introducing a light emitted from the light source, to the light diffuser, the light guide partially making close contact with the light diffuser and being partially arranged in the first hole of the substrate.

18 Claims, 4 Drawing Sheets

LIGHT DIFFUSION UNIT

BACKGROUND OF THE INVENTION

1. Field of the Invention

The invention relates to a light diffusion unit used for a portable electronic communication terminal, for instance.

2. Description of the Related Art

A portable electronic communication terminal such as a cellular phone is designed to include a light diffusion unit for introducing a light emitted from a light source such as a light-emitting diode (LED), to lens, a button or liquid crystal. A portable electronic communication terminal is recently required to be thinner and thinner, and lighter and lighter in weight. Accordingly, a light diffusion unit is also required to be as small as possible. To this end, for instance, an attempt has been made to form a light guide thinner for uniformly introducing a light emitted from a light source, to the light guide.

FIG. 1 is a cross-sectional view of a conventional light diffusion unit.

The illustrated light diffusion unit 101 is comprised of a substrate 105, a case 106 formed with a hole 106a and covering the substrate 105 therewith, a light source 104 mounted on the substrate 105, a light diffuser 103 arranged in the hole 106a of the case 106 for externally radiating a light emitted from the light source 104, and a light guide 102 arranged between the substrate 105 and the light diffuser 103 for introducing a light emitted from the light source 104, to the light diffuser 103.

In operation of the light diffusion unit 101, when the light diffuser 103 is downwardly pushed, the light guide 102 is deformed, resulting in that a projection formed on a lower surface of the light guide 102 pushes a switch 108 formed on the substrate 105. As a result of the switch 108 being pushed, the light source 104 is turned on, and hence, emits a light. The light source 104 emits a light not only when the switch 108 is pushed, but also when a call is transmitted or received, and a battery is being charged.

A light emitted from the light source 104 is introduced into the light guide 102, and is diffused in the light guide 102. Then, the thus diffused light illuminates the light diffuser 103 exposed out of the case 106.

In order for the substrate 105 not to be seen through the light diffuser 103, the substrate 105 and the switch 108 are covered with a sheet 107. The sheet 107 is composed of a material which reflects and/or diffuses a light, and assists a light to be diffused in the light guide 102.

However, if the light guide 102 does not have a sufficient thickness, a light emitted from the light source 104 is not adequately diffused in the light guide 102, resulting in that the light diffuser 103 cannot be uniformly illuminated. For instance, only an area of a surface of the light diffuser 103, closer to the light source 104, is only made bright, and, in contrast, an area of a surface of the light diffuser 103, remoter from the light source 104, is made dark. The light diffuser 103 would have greater uniformity in brightness such as mentioned above, if the light diffuser 103 had a greater surface area.

It would be quite difficult to solve the above-mentioned problem only by adding the sheet 107. It would be necessary to increase the number of a light source such as LED in order to introduce a greater amount of light to the light diffuser 103.

However, an increase in the number of a light source newly causes another problem of increased consumption of power.

Furthermore, if the light guide were designed to have a greater thickness, the light diffusion unit would be thicker, which is contradictory to the above-mentioned requirement that a portable electronic communication terminal is required to be thinner and lighter.

Japanese Unexamined Patent Publication No. 7-58815 has suggested an operating unit in a cellular phone, including a cabinet in which a main substrate is arranged and which is formed at an outer surface thereof with a recessed portion, a control substrate on which a plurality of contacts are formed by printing, and on which a light-emitting device is mounted, a sheet composed of light-permeable and elastic material, and having key tops defined by light-impermeably printing the sheet such that figures and letters remain not printed in areas in alignment with the contacts, and a cover formed with openings in alignment with the key tops, and formed with ribs for pushing the sheet.

Japanese Unexamined Patent Publication No. 2000-30561, which is based on French patent application No. 9803142, has suggested a contact detecting device including a first insulating film defining at least one dome having an inner surface on which a contact electrode layer is formed, and an outer surface, and a second insulating film supporting thereon a detecting circuit which detects whether the contact electrode layer is electrically connected thereto. A layer composed of electroluminescence material is formed directly on the first insulating film such that the layer is positioned on a flat surface surrounding the outer surface.

Japanese Unexamined Patent Publication No. 7-273854 has suggested a cellular phone including a key top plate composed of light-permeable synthetic resin. The key top plate is formed with upwardly projecting key tops. The key top plate is arranged at a rear of a case of the cellular phone such that key tops are exposed through holes formed with the case. A light-emitting diode is mounted on a lower surface of the key top plate. A light emitted from the light-emitting diode is introduced through the key top plate to the key tops for illuminating the key tops. A mirror-like reflection layer is formed either on a surface of the key top plate except the key tops, or on a rear surface of the case. As an alternative, the key top is covered at a surface thereof except the key tops with a mirror-like reflection sheet. A light having been introduced into the key top plate and having been reflected at the reflection layer or the reflection sheet is introduced into the key tops.

Japanese Unexamined Patent Publication No. 9-198902 has suggested a key illuminator in a cellular phone, including keys to be pushed by a user, formed at a lower surface thereof with a projection, and at least partially light-permeable between upper and lower surfaces, a case formed with windows in which the keys are arranged, a switch transmitting a control signal when pushed by the projection, and a planar light-emitter including a water-resistant illuminator which emits a light on receipt of power and which is in the form of a film, a transparent electrode adhered to a first surface of the planar light-emitter, and an electrode adhered to a second surface of the planar light-emitter. The water-resistant illuminator is formed with a hole through which the projection makes contact with the switch.

Japanese Unexamined Patent Publication No. 11-297161 has suggested a key structure used for a cellular phone, including a substrate, a base positioned above the substrate, a film formed on the base and having a plurality of pairs of fixed contacts, movable contacts covering the fixed contacts, key tops through which the movable contacts, and a light-emitting device which illuminates the key tops. The light-emitting device is positioned on the substrate, but below the base such that a light emitted from the light-emitting device passes through the base and the film.

The above-mentioned problem remain unsolved even in the above-mentioned Publications.

SUMMARY OF THE INVENTION

In view of the above-mentioned problems in the conventional light diffusion units, it is an object of the present invention to provide a light diffusion unit in which only a thickness of a light guide is increased without an increase in the number of a light source and further without an increase in a thickness of a portable electronic communication terminal including the light diffusion unit.

In one aspect of the present invention, there is provided a light diffusion unit including (a) a substrate formed with a first hole, (b) a case formed with a second hole and covering the substrate therewith, (c) a light source mounted on the substrate, (d) a light diffuser arranged in the second hole of the case for externally radiating a light emitted from the light source and (e) a light guide arranged between the substrate and the light diffuser for introducing a light emitted from the light source, to the light diffuser, the light guide partially making close contact with the light diffuser and being partially arranged in the first hole of the substrate.

For instance, the light guide may have a first extension extending outwardly therefrom above the substrate to cover the light source therewith.

The light guide may have a second extension extending outwardly therefrom above the substrate to cover therewith a switch mounted on the substrate such that when the light diffuser is downwardly pushed, the second extension pushes the switch, the switch being not in alignment with the light diffuser.

It is preferable that the first and second holes are in alignment with each other.

For instance, the light diffuser may be comprised of a body portion slidable through the second hole of the case, and a flange portion extending outwardly from the cylindrical portion at a bottom of the body portion and acting as a stopper when the body portion outwardly slides through the second hole.

The light guide may be marked with marks.

For instance, the light guide may be composed of resin or rubber.

It is preferable that the light guide is opaline in color.

There is further provided a light diffusion unit including (a) a substrate formed with a first hole, (b) a case having a first portion covering an upper surface of the substrate therewith and a second portion covering a lower surface of the substrate therewith, the first portion being formed with a second hole and the second portion being formed with a third hole, (e) a light source mounted on the substrate, (d) a first light diffuser arranged in the second hole of the first portion of the case for externally radiating a light emitted from the light source, (e) a second light diffuser arranged in the third hole of the second portion of the case for externally radiating a light emitted from the light source, and (f) a light guide arranged between the first and second light diffusers for introducing a light emitted from the light source, to the first and second light diffusers, the light guide having an upper surface at which the light guide makes close contact with the first light diffuser, a lower surface at which the light guide makes close contact with the second light diffuser, and a main body slidable through the first hole of the substrate.

The advantages obtained by the aforementioned present invention will be described hereinbelow.

In the present invention, the substrate is formed with a hole just below the light guide, which allows the light guide to have an increased thickness. This ensures an increase in a light-introduction and light-diffusion efficiency of a light emitted from the light source. As a result, the light diffuser can be uniformly illuminated.

In addition, even if the light diffuser had an increased area, since it is no longer necessary to increase the number of a light source, it would be possible to avoid an increase in power consumption.

Furthermore, the light diffusion unit in accordance with the present invention does not need to include a sheet such as a light-reflection sheet, ensuring a reduction in the number of parts constituting the light diffusion unit, and reduction in costs for fabricating the light diffusion unit.

As is obvious in view of the above, the present invention meets with the requirement for a thinner and lighter light diffusion unit, and is suitable to a cellular phone as a switch.

The second extension ensures that a switch is certainly pushed, even if the switch is located far away from the light guide.

The light diffusion unit which includes the first and second light diffusers at opposite sides of the light guide makes it possible to make illumination at opposite sides of the light diffusion unit without an increase in the number of a light source such as LED.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

First Embodiment

Figure 1:
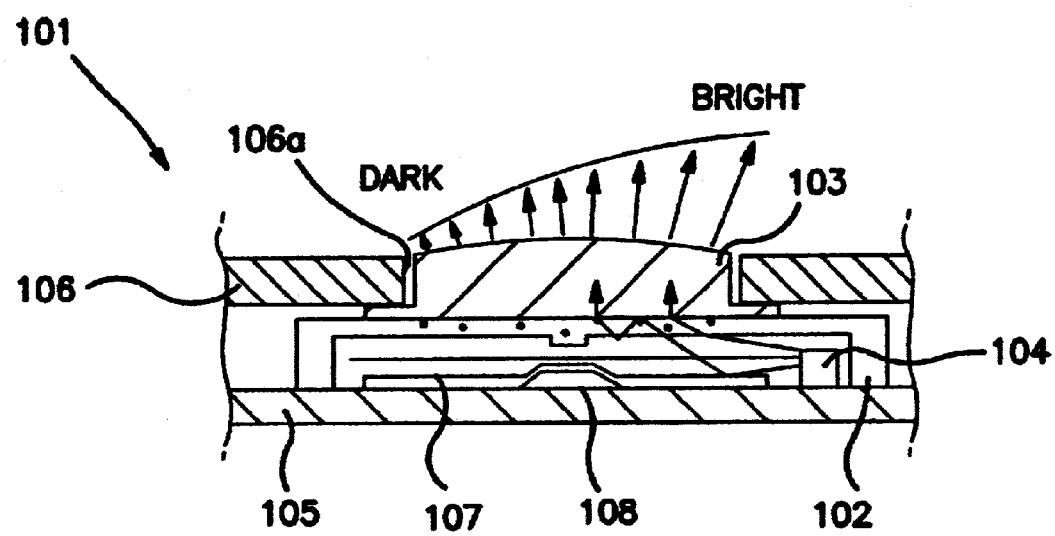
FIG. 1 is a cross-sectional view of a conventional light diffusion unit.
Figure 2:
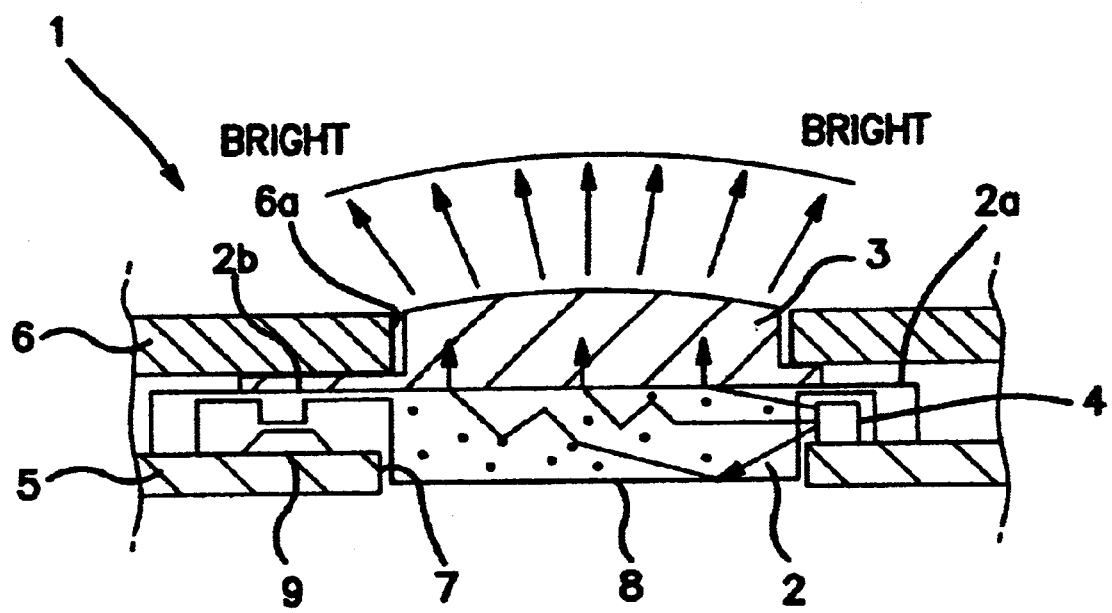
FIG. 2 is a cross-sectional view of the light diffusion unit in accordance with the first embodiment of the present invention.

FIG. 1 is a cross-sectional view of the light diffusion unit 1 in accordance with the first embodiment.

The light diffusion unit 1 is comprised of a circuit substrate 5 formed with a first through-hole 7, a case 6 formed with a second through-hole 6a and covering the circuit substrate 5 therewith, a light source 4 mounted on the circuit substrate 5, a light diffuser 3 arranged in the second hole 6a of the case 6 for externally radiating a light emitted from the light source 4, and a light guide 2 arranged between the circuit substrate 5 and the light diffuser 3 for introducing a light emitted from the light source 4, to the light diffuser 3.

The light diffuser 3 is comprised of a rectangular parallelopiped portion having an arcuate upper surface and slidable through the second through-hole 6a of the case 6, and a flange portion extending outwardly from the cylindrical portion at a bottom of the cylindrical portion and acting as a stopper when the cylindrical portion outwardly slides through the second through-hole 6a.

The light diffuser 3 is composed of resin or rubber, and allows a light emitted from the light source 4 through the light guide 2, to pass therethrough. For instance, the light diffuser a defines a lens or button exposed at a surface of a portable electronic communication device.

The first and second through-holes 7 and 6a are in alignment with each other.

A switch 9 is formed on the circuit substrate 5 in no alignment with the second through-hole 6a of the case 6.

The light guide 2 is in the form of a rectangular parallelopiped. The light guide 2 makes close contact at its upper surface with the light diffuser 3 and being inserted in the first through-hole 7 of the circuit substrate 5.

The light guide 2 has a first extension 2a comprised of a first portion extending outwardly from the light guide 2 above the circuit substrate 5, and a second portion connecting to a distal end of the first portion and vertically extending to the circuit substrate 5. The second portion is fixed at its distal end to the circuit substrate 5. The first extension 2a entirely covers the light source 4 therewith.

The light guide 2 further has a second extension 2b comprised of a first portion extending outwardly from the light guide 2 above the circuit substrate 5, and a second portion connecting to a distal end of the first portion and vertically extending to the circuit substrate 5. The second portion is fixed at its distal end to the circuit substrate 5. The second extension 2b entirely covers the switch 9 therewith. The first portion of the second extension 2b is formed at a lower surface thereof with a projection which actually makes contact with the switch 9.

The second extension 2b ensures that when the light diffuser 3 is downwardly pushed, the switch 9 is also pushed by the second extension 2b.

The light guide 2 is composed of resin or rubber, and is opaline in color.

The light guide 2 is designed to have a thickness measured from a lower surface of the light diffuser 3 to a lower surface of the circuit substrate 5. Hence, the switch 9 is not located below the light guide 2 unlike the conventional light diffusion unit illustrated in FIG. 1, and is mounted on the circuit substrate 5 away from the light guide 2.

Hereinbelow is explained an operation of the light diffusion unit in accordance with the first embodiment.

When a user pushes the light diffuser 3 downwardly, the light diffuser 3 slides through the second through-hole 6a of the case 6 downwardly. As a result, the light guide 2 is also pushed downwardly. This causes the first portions of the first and second extensions 2a and 2b to be deformed downwardly, because the second portions of the first and second extensions 2a and 2b are fixed to the circuit substrate 5. Hence, the projection formed on a lower surface of the first portion of the second extension 2b makes contact with the switch 9, and resultingly, power is fed to the light source 4. As a result, the light source 4 starts emitting a light.

A light emitted from the light source 4 enters the light guide 2, and then, is diffused in the light guide 2. The thus diffused light enters the light diffuser 3. As a result, the light diffuser 3 illuminates.

Since the light guide 2 is opaline in color as mentioned above, a light emitted from the light source 4 is effectively diffused in the light guide 2.

In the light diffusion unit 1, the light guide 2 is partially inserted into the first through-hole 7. This ensures that the light guide 2 can be formed thicker without an increase in a total thickness of an electronic communication terminal including the light diffusion unit 1.

Accordingly, a light introduced into the light guide 2 is diffused to a greater degree than the conventional light diffusion unit illustrated in FIG. 1 by virtue of an increased thickness of the light guide 2, ensuring the light diffuser 3 receives a greater amount of light from the light guide 2 than the conventional light diffusion unit. Thus, even if the light diffuser 3 had an increased area, it would be possible to uniformly illuminate the light diffuser by means of the single light source 4 without an increase in the number of a light source.

In order to enhance a rate of light reflection to the light diffuser 3, a bottom surface 8 of the light guide 2 may be printed white, or a white tape may be adhered to the bottom surface 8 or a lower surface of the circuit substrate 5. By printing the bottom surface 8 or adhering the white tape to the bottom surface 8 or a lower surface of the circuit substrate 5, a light emitted from the light source 4 may be diffused more widely.

Second Embodiment

Figure 3:
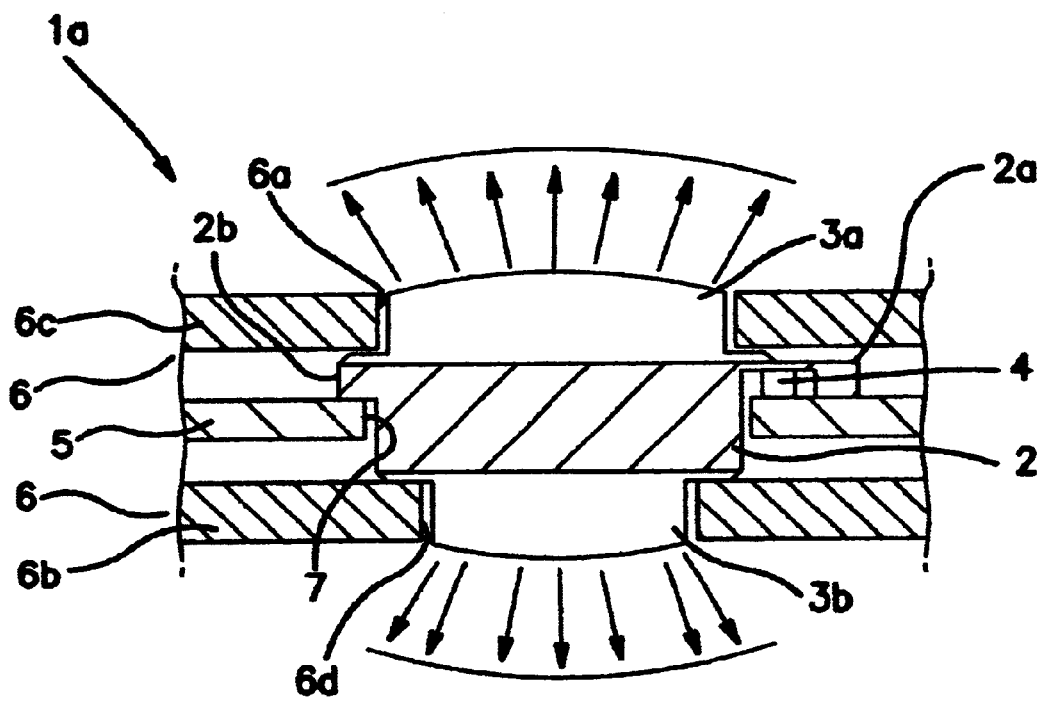
FIG. 3 is a cross-sectional view of the light diffusion unit in accordance with the second embodiment of the present invention.

FIG. 3 is a cross-sectional view of the light diffusion unit 1A in accordance with the second embodiment.

The light diffusion unit 1A is comprised of a circuit substrate 5 formed with a first through-hole 7, a case 6 having a first portion 6C covering an upper surface of the circuit substrate 5 therewith and formed with a second through-hole 6a, and a second portion 6B covering a lower surface of the circuit substrate 5 therewith and formed with a third through-hole 6d, a light source 4 mounted on the circuit substrate 5, a first light diffuser 3a arranged in the second through-hole 6a of the first portion 60 of the case 6 for externally radiating a light emitted from the light source 4, a second light diffuser 3b arranged in the third through-hole 6d of the second portion 6B of the case 6 for externally radiating a light emitted from the light source 4, and a light guide 2 arranged between the first and second light diffusers 3a and 3b for introducing a light emitted from the light source 4, to the first and second light diffusers 3a and 3b.

The first and second light diffusers 3a and 3b have the same structure as that of the light diffuser 3 in the first embodiment.

The first, second and third through-holes 7, 6c and 6d are in alignment with one another.

The light guide 2 is in the form of a rectangular parallelopiped. The light guide 2 is slidably inserted in the first through-hole 7 of the circuit substrate 5, and makes close contact at its upper surface with the first light diffuser 3a and at its lower surface with the second light diffuser 3b.

The light guide 2 has a first extension 2a having the same structure as the first extension 2a explained in the first embodiment.

The light guide 2 further has a second extension 2b makes at its lower surface with the circuit substrate 5.

The light guide 2 is designed to have a thickness measured from a lower surface of the first light diffuser 3a to an upper surface of the second light diffuser 3b. Namely, the light guide 2 has a thickness extending beyond a lower surface of the circuit substrate 5.

Whereas the light diffuser 3 is arranged only above the light guide 2 in the first embodiment, the first and second light diffusers 3 and 3b are arranged above and below the light guide 2 in the second embodiment.

Hereinbelow is explained an operation of the light diffusion unit 1A in accordance with the second embodiment.

A light emitted from the light source 4 enters the light guide 2, and advances in the light guide 2. During advancing in the light guide 2, the light is diffused. The thus diffused light is introduced to both the fist and second light diffusers 3a and 3b. Hence, the first and second light diffusers 3a and 3b are simultaneously illuminated.

Third Embodiment

Figure 4:
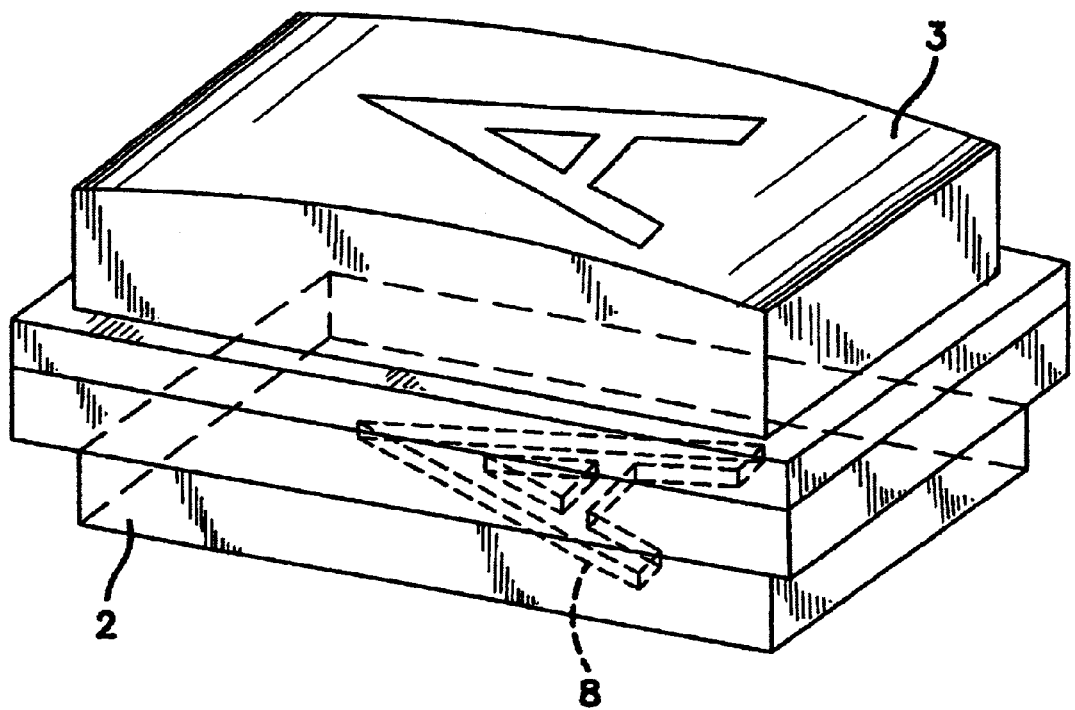
FIG. 4 is a cross-sectional view of the light diffusion unit in accordance with the third embodiment of the present invention.

FIG. 4 is a perspective view of the light diffuser 3 and the light guide 2 in the light diffusion unit in accordance with the third embodiment.

In the third embodiment, the light guide 2 is marked with a letter "A" at an upper and/or a lower surface thereof. The letter "A" may be marked by printing or carving an upper and/or a lower surface of the light guide 2. The light diffusion unit in accordance with the third embodiment has the same structure as the structure of the light diffusion unit in accordance with the first embodiment except the above-mentioned letter "A".

In operation, when the light diffuser 3 is illuminated with a light having been introduced into the light guide 2, the letter "A" is imaged at a surface of the light diffuser 3.

In place of a letter, any other marks such as a figure or a character may be printed or carved on an upper and/or lower surface of the light guide 2.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2000-283990 filed on Sep. 19, 2000 including specification, claims, drawings and summary is incorporated herein by reference in its entirety.

What is claimed is:

1. A light diffusion unit comprising:
   (a) a substrate formed with a first hole;
   (b) a case formed with a second hole and covering said substrate therewith;
   (c) a light source mounted on said substrate;
   (d) a light diffuser arranged in said second hole of said case for externally radiating a light emitted from said light source; and
   (e) a light guide arranged between said substrate and said light diffuser for introducing a light emitted from said light source, to said light diffuser, said light guide partially making close contact with said light diffuser and being partially arranged in said first hole of said substrate.

2. The light diffuser as set forth in claim 1, wherein said light guide has a first extension extending outwardly therefrom above said substrate to cover said light source therewith.

3. The light diffuser as set forth in claim 1, wherein said light guide has a second extension extending outwardly therefrom above said substrate to cover therewith a switch mounted on said substrate such that when said light diffuser is downwardly pushed, said second extension pushes said switch, said switch being not in alignment with said light diffuser.

4. The light diffuser as set forth in claim 1, wherein said first and second holes are in alignment with each other.

5. The light diffuser as set forth in claim 1, wherein said light diffuser is comprised of a body portion slidable through said second hole of said case, and a flange portion extending outwardly from said cylindrical portion at a bottom of said body portion and acting as a stopper when said body portion outwardly slides through said second hole.

6. The light diffuser as set forth in claim 1, wherein said light guide is marked with marks.

7. The light diffuser as set forth in claim 1, wherein said light guide is composed of resin or rubber.

8. The light diffuser as set forth in claim 1, wherein said light guide is opaline in color.

9. A light diffusion unit comprising:
   (a) a substrate formed with a fist hole;
   (b) a case having a first portion covering an upper surface of said substrate therewith and a second portion covering a lower surface of said substrate therewith, said first portion being formed with a second hole and said second portion being formed with a third hole;
   (c) a light source mounted on said substrate;
   (d) a first light diffuser arranged in said second hole of said first portion of said case for externally radiating a light emitted from said light source;
   (e) a second light diffuser arranged in said third hole of said second portion of said case for externally radiating a light emitted from said light source; and
   (f) a light guide arranged between said first and second light diffusers for introducing a light emitted from said light source, to said first and second light diffusers,
   said light guide having an upper surface at which said light guide makes close contact with said first light diffuser, a lower surface at which said light guide makes close contact with said second light diffuser, and a main body slidable through said first hole of said substrate.

10. The light diffuser as set forth in claim 9, wherein said light guide has a first extension extending outwardly therefrom above said substrate to cover said light source therewith.

11. The light diffuser as set forth in claim 9, wherein said first to third holes are in alignment with one another.

12. The light diffuser as set forth in claim 9, wherein each of said first and second light diffusers is comprised of a body portion slidable through said second or third hole, and a flange portion extending outwardly from said body portion at a bottom of said body portion.

13. The light diffuser as set forth in claim 9, wherein said light guide is marked with marks.

14. The light diffuser as set forth in claim 9, wherein said light guide is composed of resin or rubber.

15. The light diffuser as set forth in claim 9, wherein said light guide is opaline in color.

16. A light diffusion unit comprising:
   a substrate having a first hole;
   a case covering said substrate and having a second hole;

a switch mounted on said substrate;

a light source mounted directly on said substrate;

a light diffuser arranged in said second hole for radiating a light emitted from said light source; and a light guide arranged between said substrate and said light diffuser for diffusing a light emitted from said light source, to said light diffuser, said light guide partially contacting said light diffuser and being partially arranged in said first hole.

17. The light diffuser as claimed in claim 1, wherein said light guide has a first extension extending outwardly therefrom above said substrate to cover said light source.

18. The light diffuser as set forth in claim 1, wherein said light guide has a second extension extending outwardly therefrom above said substrate to cover therewith said switch so that when said light diffuser is depressed, said second extension contacts said switch.

* * * * *